July 5, 1932. J. L. DRAKE 1,865,843
PROCESS AND APPARATUS FOR PRODUCING SHEET GLASS
Filed Oct. 29, 1927
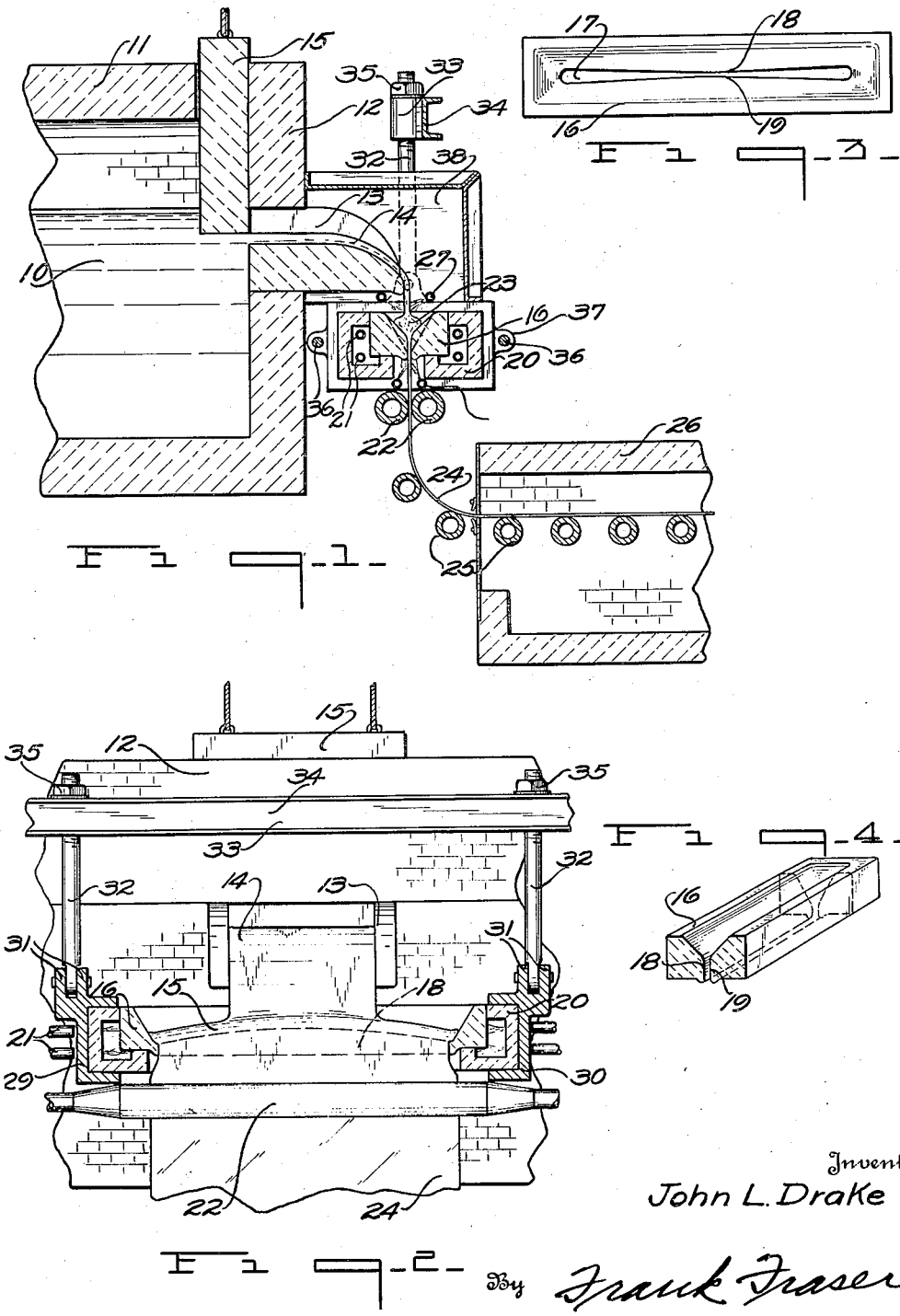
Inventor
John L. Drake
By Frank Fraser,
Attorney Patented July 5, 1932

1,865,843

UNITED STATES PATENT OFFICE

JOHN L. DRAKE, OF TOLEDO, OHIO, ASSIGNOR TO LIBBEY-OWENS-FORD GLASS COMPANY, OF TOLEDO, OHIO, A CORPORATION OF OHIO

PROCESS AND APPARATUS FOR PRODUCING SHEET GLASS

Application filed October 29, 1927. Serial No. 229,554.

The present invention relates to a process and apparatus for producing sheet glass.

An important object of the invention is to provide a process and apparatus for producing sheet glass wherein a stream of molten glass flowing from a furnace or other suitable container is reduced to a sheet of substantially predetermined dimensions, the distribution and flow of glass being controlled in a manner such that the glass when introduced into the sheet will have a substantially uniform flow movement throughout its entire width.

Another object of the invention is to provide such a process and apparatus wherein preferably slotted means is provided for receiving a relatively narrow stream of molten glass, the said means being constructed to cause a widening of the stream and to impart thereto a substantially uniform flow movement throughout its entire width as it passes to sheet forming means.

A further object of the invention is to provide such a process and apparatus wherein a furnace or other suitable container is provided for supplying a stream of molten glass to sheet forming means, a preferably slotted member being interposed between the furnace and sheet forming means for receiving the glass from the former and feeding it to the latter, said member being constructed in a manner to substantially equalize the flow movement of the steam throughout its entire width as the said stream flows therethrough.

Other objects and advantages of the invention will become more apparent during the course of the following description when taken in connection with the accompanying drawing.

In the drawing forming a part of this application and wherein like numerals are employed to designate like parts throughout the same, Fig. 1 is a vertical longitudinal section through improved sheet glass forming apparatus constructed in accordance with the present invention.

Fig. 2 is a front view thereof partially in section.

Fig. 3 is a top plan view of the slotted member, and

Fig. 4 is a detail perspective sectional view of the same.

In accordance with the present invention, a mass of molten glass 10 is adapted to be created within a furnace or other suitable container 11. Arranged within the front end wall 12 of the furnace is a relatively narrow overflow lip or spout 13 through which the molten glass is adapted to flow in a relatively thick, narrow stream 14, this flow being controlled preferably by means of an adjustable gate or closure member 15.

Arranged beneath the overflow spout 14 is an elongated member or block 16 having a longitudinally extending slot 17 therein substantially V-shaped in cross section. The opposite walls or faces 18 and 19 of slot 17 are bowed inwardly as shown in Fig. 3 so that the slot is relatively narrower at its center than at its ends. Also, the upper surfaces of the adjacent walls of the slot are arched as shown in Fig. 2 so that there is a relatively large area of contact with the glass at the central portion of the slot, and which area of contact gradually decreases toward the opposite ends thereof. The slotted member 16 may be substantially surrounded, if desired, by a heating chamber 20 heated by means of burners or the like 21 positioned preferably at the opposite ends thereof.

Arranged beneath the slotted member 16 is a pair of sheet forming rolls 22, these rolls being ordinarily positively driven in any preferred or well known manner and the space therebetween determining the thickness of sheet produced.

In carrying out the present invention, the molten glass 10 within the furnace or other suitable container 11 is adapted to flow through the overflow spout 13 in a relatively thick, narrow stream 14 which is caught within the slotted block or member 16 as at 23. Since the upper surfaces of the adjacent walls of the slot are arched, the molten glass is caused to flow toward the opposite ends of said member and thus be evenly distributed throughout the length of the slot as shown in Fig. 2. In other words, the glass is distributed transversely with respect to its direction of flow so that the relatively narrow stream 14 is materially widened before passing to the sheet forming rolls 22.

The molten glass then flowing downwardly through the slot 17 is received between and reduced to a sheet of substantially predetermined width and thickness by the rolls 22, the resultant sheet 24 being carried upon a series of rolls 25 into and horizontally through an annealing leer 26. Burners or other suitable heating means 27 may be provided for controlling the temperature of the glass as it flows to the slotted member 16, while burners or other heating means 28 may be utilized for heating the glass and maintaining it in a plastic workable condition as it flows through the slot.

As the molten glass flows from the spout 13 in a relatively narrow stream, it will be caused to flow to each end of the slotted member due to the provision of the arched surfaces. The molten glass within the slotted member will not ordinarily be of a uniform temperature throughout its entire width but instead, the border portions thereof will usually be somewhat cooler than the central portion thereof. Due to this difference in temperature, the flow movement of the cooler border portions will naturally be somewhat more sluggish than the flow movement of the central hotter portion with the result that if the slot was of the same size throughout its entire length, the central portion of the glass would flow through the slot much more rapidly than would the border portions, so that the glass introduced into the sheet would have an un-uniform flow movement throughout its width. Such an un-uniform flow movement causes difficulty in the forming of a good sheet of glass.

In carrying out the present invention, however, it will be noted that the slot 17 is relatively narrower at its center than at its ends, the narrower central portion being in line with the relatively narrow stream of molten glass 14 flowing from the furnace. Consequently, it will be readily apparent that the hotter central portion of the molten glass flowing through the slot will be retarded to a greater degree than will the cooler border portions which are permitted to flow more freely through the wider end portions of the slot. Also, since the upper surfaces of the walls of the slot are arched, the area of contact between the glass and member is greatest at the central portion of the slot and that this area of contact gradually decreases towards the opposite ends thereof so that the central flow of molten glass will contact with the member for a longer period of time than will the border portions. Thus, the hotter central portion will also be retarded in this manner to a greater extent than will the cooler border portions.

Due to the particular construction of the slotted member, the central portion of the stream of molten glass which ordinarily has a tendency to flow faster than the border portions will be retarded to a greater degree than will said border portions with the result that the molten glass delivered to the sheet forming rolls 22 will have a substantially uniform flow movement throughout its entire width.

The fact that the stream of glass introduced into the sheet will have a substantially uniform flow movement throughout its entire width will result in the production of a better sheet of glass. The slower flow movement also affects the temperature so that the temperature as well as the speed of flow is acted upon in a manner to equalize the rate of flow and the temperature of the glass throughout its entire width.

While the slotted member 16 and heating chamber 20 may be supported in any desired manner, the construction herein illustrated for accomplishing this purpose consists of a pair of castings or the like 29 and 30 which surround the opposite ends of the heating chamber 20, the slotted member 16 being supported by said chamber as clearly shown in the drawing. Each casting is preferably provided with a pair of centrally disposed spaced upstanding ears 31 between which is pivotally mounted the lower end of a hanger rod 32. The upper end of said rod extends through a sleeve 33 carried by the channel beam 34 and has threaded thereupon a nut 35. Upon proper adjustment of the nuts 35, the hanger rods 32 can be moved upwardly or downwardly as desired to raise or lower either or both ends of the slotted member 16. Thus, the said slotted member can be tilted lengthwise as preferred so that proper distribution of the molten glass within the slot 17 thereof may be achieved. The castings 29 and 30 may also be connected by means of tie-rods or the like 36 extending through ears 37 formed at the opposite sides of said castings. The flow spout 13 may be enclosed by a casing or hood 38 if found desirable, this hood being ordinarily supported upon the castings and adjustable therewith.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In apparatus for producing sheet glass, a receptacle containing a mass of molten glass and having an overflow spout by which a relatively thick, narrow stream is caused to flow therefrom, a slotted member arranged beneath said flow spout for receiving the stream of molten glass therefrom, the slot of said member being narrower at its center than at its ends, with the upper surfaces of the walls of said slot being arched, a pair of sheet forming rolls arranged beneath said slotted member for receiving the molten glass therefrom and reducing it to a sheet of predetermined thickness, a heating chamber surrounding said slotted member, and means for mounting said slotted member by which it may be tilted longitudinally.

2. In apparatus for producing sheet glass, a slotted member for receiving a stream of molten glass, sheet forming means arranged in proximity to said member for receiving the molten glass therefrom, and means for mounting said slotted member by which it may be tilted longitudinally to effect proper distribution of the molten glass within the slot of said member.

3. In apparatus for producing sheet glass, a slotted member for receiving a stream of molten glass, sheet forming means arranged in proximity to said member for receiving the molten glass therefrom, a heating chamber surrounding the slotted member, and means for mounting said slotted member by which it may be tilted longtiudinally to effect proper distribution of the molten glass within the slot of said member.

4. In apparatus for producing sheet glass, a slotted member for receiving a stream of molten glass, sheet forming means arranged in proximity to said member for receiving the molten glass therefrom, a heating chamber surrounding the slotted member, and means for mounting the heating chamber and slotted member by which said member and chamber may be tilted longitudinally as a unit.

5. In apparatus for producing sheet glass, a slotted member for receiving a stream of molten glass, a pair of forming rolls positioned beneath the slotted member for receiving the molten glass therefrom, a heating chamber surrounding the slotted member and supporting the same, and means connected with the heating chamber for mounting the same and by means of which said chamber and slotted member may be tilted longitudinally as a unit.

6. In apparatus for producing sheet glass, a slotted member for receiving a downwardly flowing stream of molten glass and being so constructed as to maintain the said glass in a single undivided stream, sheet forming means arranged in proximity to said member for receiving the molten glass therefrom, and means for mounting said slotted member by which it may be tilted longitudinally to effect proper distribution of the molten glass within the slot of said member.

7. In apparatus for producing sheet glass, a slotted member for receiving a downwardly flowing stream of molten glass and being so constructed as to maintain said glass in a single undivided stream, sheet forming means arranged in proximity to said member for receiving the molten glass therefrom, a heating chamber surrounding the slotted member, and means for mounting said slotted member by which it may be tilted longitudinally to effect proper distribution of the molten glass within the slot of said member.

8. In apparatus for producing sheet glass, a slotted member for receiving a stream of molten glass, a heating chamber surrounding the slotted member, and means for mounting the heating chamber and slotted member by which said member and chamber may be tilted longitudinally as a unit.

9. In apparatus for producing sheet glass, a slotted member for receiving a stream of molten glass, a heating chamber surrounding the slotted member and supporting the same, and means connected with the heating chamber for mounting the same and by means of which said chamber and slotted member may be tilted longtiudinally as a unit.

Signed at Toledo, in the county of Lucas and State of Ohio, this 27th day of October, 1927.

JOHN L. DRAKE.